United States Patent [19]
Hirano et al.

[11] Patent Number: 6,144,178
[45] Date of Patent: Nov. 7, 2000

[54] DISK DRIVE WITH CONTROLLED REDUCED INTERNAL PRESSURE

[75] Inventors: Toshiki Hirano, San Jose, Calif.; Kiyoshi Satoh, Fujisawa, Japan

[73] Assignee: International Business Machines Corporation, Armonk, N.Y.

[21] Appl. No.: 09/370,782

[22] Filed: Aug. 5, 1999

[51] Int. Cl.[7] ...................................................... H02P 7/00
[52] U.S. Cl. ........................... 318/476; 318/490; 360/133; 369/77.2
[58] Field of Search .............................. 360/98, 133, 137, 360/86; 369/76, 77.2, 44.19; 318/476

[56] References Cited

U.S. PATENT DOCUMENTS

| | | | |
|---|---|---|---|
| 4,367,503 | 1/1983 | Treseder | 360/98 |
| 4,514,672 | 4/1985 | O'gwynn | 318/616 |
| 5,841,607 | 11/1998 | Khan et al. | 360/99.08 |

FOREIGN PATENT DOCUMENTS

| | | | |
|---|---|---|---|
| 7021752A | 1/1995 | Japan | G11B 33/00 |
| 8077527A | 3/1996 | Japan | G11B 5/455 |
| 10222960A | 8/1998 | Japan | G11B 25/04 |

OTHER PUBLICATIONS

National Semiconductor Corp., "LM139/LM239/LM339—A Quad of Independently Functioning Comparators", Application Note 74, Jan. 1973.

A. Tietze, "Disk File with Reduced or Eliminated Air Effects", IBM Technical Disclosure Bulletin, vol. 23, No. 9, Feb. 1981, pp. 4310–4311.

*Primary Examiner*—David Martin
*Assistant Examiner*—Rita Leykin
*Attorney, Agent, or Firm*—Thomas R. Berthold

[57] ABSTRACT

A rigid magnetic recording disk drive includes a vacuum pump attached to the disk drive housing for removing air from within the housing so that the disk drive is operated at a reduced internal gas pressure. The pump motor is controlled by control circuitry that receives an input signal representative of the pressure within the housing to enable the pressure to be maintained within a predetermined reduced pressure range. Because spindle motor current has been directly correlated with internal pressure, a signal representative of the spindle motor current is used as the input to the pump control circuitry. The pump control circuitry also prevents the pump from turning on until the spindle motor has reached its stable operating speed, and from turning on when the disk drive is reading or writing data. Because of the reduced internal pressure the disk drive operates at a significantly higher disk RPM with only a minimal increase in power consumption and without any increase in track misregistration.

23 Claims, 6 Drawing Sheets

DISK DRIVE WITH CONTROLLED REDUCED INTERNAL PRESSURE

TECHNICAL FIELD

This invention relates in general to magnetic recording disk drives, and more particularly to magnetic recording rigid disk drives with high speed spindle motor rotation.

BACKGROUND OF THE INVENTION

Disk drives, also called disk files, are information storage devices that use a rotatable rigid disk with concentric data tracks containing the information, a head or transducer for reading and/or writing data onto the various tracks, and an actuator connected to a carrier for the head for moving the head to the desired track and maintaining it over the track centerline during read and write operations. The most common form of actuator is a rotary voice coil motor (VCM) actuator that moves the head carrier in a nonlinear, generally arcuate path across the disk. There are typically a number of disks mounted on a hub that is rotated by a disk drive motor, also called a spindle motor, and a number of head carriers connected to the actuator for accessing the surfaces of the disks. A housing supports the drive motor and head actuator and surrounds the heads and disks to provide a substantially sealed environment. In conventional magnetic recording disk drives, the head carrier is an air-bearing slider that has an air-bearing surface (ABS) designed to enable the slider to "fly" or ride on a bearing of air above the disk surface when the disk is rotating at its operating speed. The slider is maintained next to the disk surface by a biasing force from a suspension that connects the slider to the actuator. The suspension is attached to a rigid arm connected to the actuator.

Contact start/stop (CSS) disk drives operate with the slider in contact with the disk surface during start and stop operations when there is insufficient disk rotational speed to maintain the air bearing. To minimize the effect of "stiction", i.e., the static friction and adhesion forces between the very smooth disk surface and the slider, CSS disk drives often use a dedicated "landing zone" where the slider is parked when the drive is not operating. The landing zone is typically a specially textured nondata region of the disk. In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp. Load/unload disk drives are more commonly used in laptop and notebook computers because the parking of the slider on the ramp away from the disk surface also provides some resistance to external shocks caused by moving or dropping the computer.

To improve the performance of disk drives, particularly the rate at which the recorded data can be accessed, it is desirable to rotate the disks at high RPM. In addition, it is desirable to place the data tracks as close together as possible to maximize the data storage capacity. However, when conventional disk drives, such as commercially available 3.5 inch and 2.5 inch form factor drives, are rotated at high RPM they consume excessive power and generate excessive heat in the disk drive housing. In addition, high speed disk rotation causes airflow-induced disk "flutter" and vibration of the suspension and/or arm, which makes it difficult for the read/write head to locate the proper data track. This is referred to as track misregistration (TMR).

The use of a hermetically sealed disk drive housing containing a gas other than air, such as helium, to reduce the effect of heat generation within the housing has been proposed, as described in U.S. Pat. No. 4,367,503 and Japanese published patent application JP8077527A. IBM Technical Disclosure Bulletin, Vol. 23, No. 9 (February 1981), pp. 4310–4311, describes a removable disk pack mounted on a drive apparatus that uses reduced air pressure around the rotating disks to reduce the effects of heat generation and air turbulence. Japanese published patent application JP7021752A describes a test apparatus that uses a vacuum pump to remove air from within the test chamber for the purpose of testing the head carrier-disk interface. Japanese published patent application JP10222960A describes an optical CD-ROM drive with a vacuum pump for removing air to decrease air resistance and eliminate dust particles.

What is needed is a disk drive that can be operated at high disk RPM without consuming excessive power and without generating disk flutter or vibration of the suspension or arm.

SUMMARY OF THE INVENTION

The present invention is a rigid magnetic recording disk drive that includes a vacuum pump attached to the disk drive housing for removing air from within the housing so that the disk drive is operated at a reduced internal pressure. The pump motor is controlled by control circuitry that receives an input signal representative of the pressure within the disk drive to enable the disk drive pressure to be maintained within a predetermined reduced pressure range. In the preferred embodiment a signal representative of the spindle motor current is used as the input to the pump control circuitry. The pump control circuitry receives as input from the disk drive controller an IDLE signal (or a HEAD UNLOADED signal if the disk drive is a head load/unload type) to prevent the pump from turning on when the disk drive is reading or writing data. Means are also provided for preventing the pump from turning until the spindle motor has reached its stable operating speed. As an alternative to the spindle motor current input signal, a pressure sensor is located within the disk drive housing and provides an input signal to the pump control circuitry for turning the pump on and off to maintain the desired reduced pressure within the disk drive housing. The pump and pump motor are located in a cut-out on the exterior of the disk drive housing or within a walled-in recess of the housing so that the housing form factor is not altered, thereby allowing the disk drive with the present invention to fit into conventional computer bays. With the present invention the disk drive operates at a significantly higher RPM with only a minimal increase in power consumption and without any increase in TMR.

For a fuller understanding of the nature and advantages of the present invention, reference should be made to the following detailed description taken together with the accompanying figures.

DESCRIPTION OF THE PREFERRED EMBODIMENTS

Figure 1:
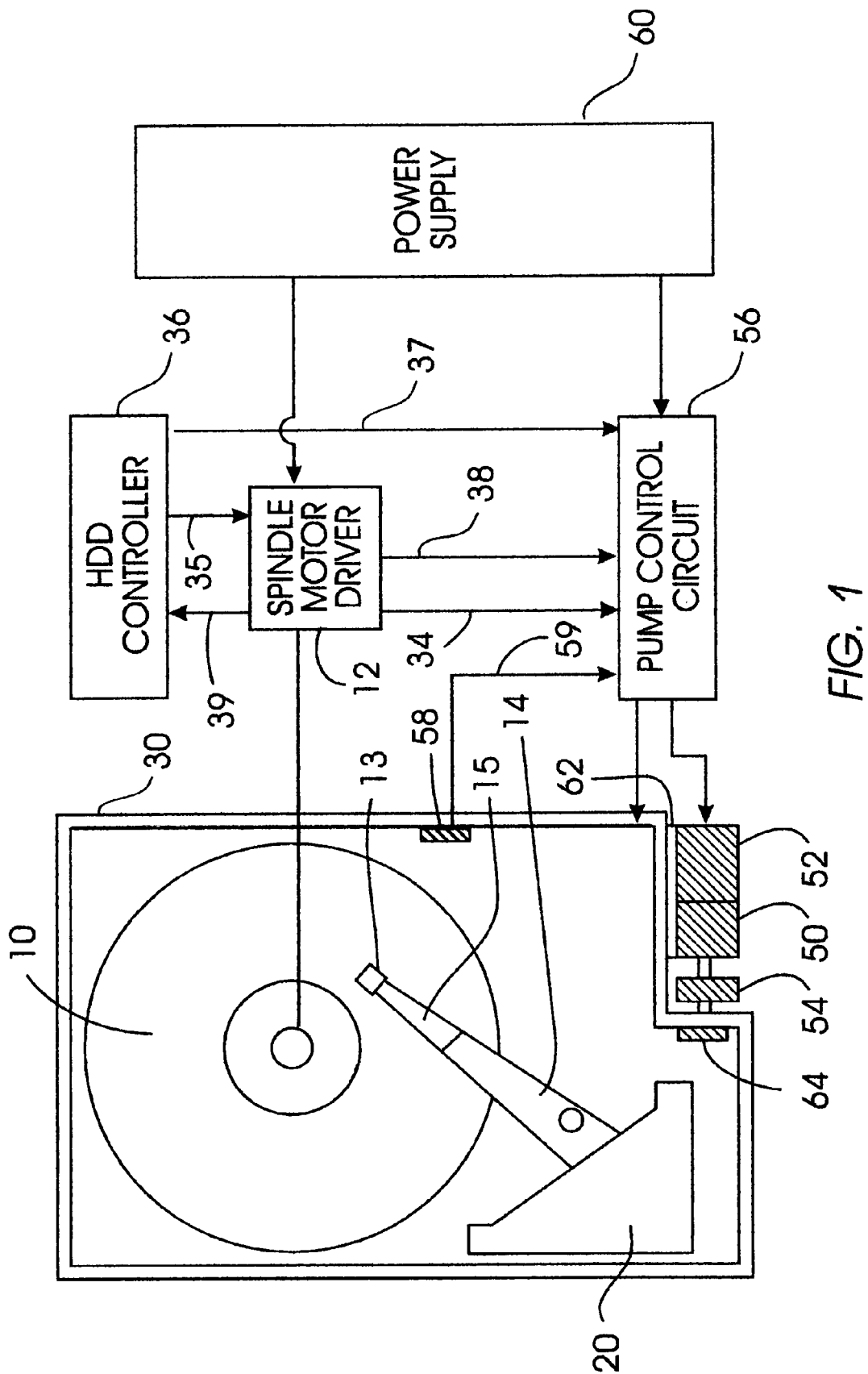
FIG. 1 is a block diagram of a magnetic recording disk drive incorporating the present invention and showing both the spindle motor current input and the pressure sensor input embodiments.

A disk drive incorporating the present invention is shown schematically in FIG. 1.

A magnetic recording disk 10 is mounted on the drive or spindle motor (not shown) that is controlled by the electronic circuitry of spindle motor driver 12. A read/write head carrier 13 is positioned on the top surface of disk 10. Carrier 13 is an air-bearing slider having an air-bearing surface facing toward the disk. The head carrier 13 supports a read/write transducer or head for reading and writing data to the magnetic media on the surface of disk 10. The head may be an inductive read/write head or a dual element head having an inductive write element and a magnetoresistive read element. Carrier 13 is attached to an actuator arm 14 by means of a suspension 15. The suspension 15 provides a slight spring force that biases the carrier 13 toward the disk surface.

Actuator arm 14 is attached to a rotary actuator 20. The actuator is typically a rotary voice coil motor (VCM) that comprises a coil movable within a fixed magnetic field. As the disk 10 rotates, the rotary actuator 20 moves the carrier 13 in a generally arcuate path radially in and out over the disk surface so that the read/write head may access different portions of the disk surface where data is desired to be read or recorded.

Both the actuator 20 and spindle motor are mounted to a base portion 30 of the disk drive housing. The housing also includes a cover (not shown) mounted over base 30. A gasket (not shown) seals the cover to the base 30 so that the disk drive housing provides a substantially sealed internal environment for the various components. In conventional disk drives the internal pressure within the housing is essentially the same as the external environment, i.e., atmospheric pressure. If the disk drive is the head load/unload type then a ramp would be mounted to the base of housing 30 near the disk outside diameter for supporting the suspension 15 so that the head carrier 13 is unloaded off the disk surface when the spindle motor is not rotating.

The various components of the disk drive are controlled in operation by control signals generated by hard disk drive (HDD) controller 36. Typically, the controller 36 comprises logic control circuits, memory storage, and a microprocessor, for example. The controller 36 provides status signals on line 37, such as an IDLE signal indicating that the head is not reading or writing data and a HEAD UNLOADED signal indicating that the head carrier is unloaded off the disk. The controller 36 also generates control signals over line 35 for the spindle motor driver 12 that controls the current to the armatures of the spindle motor to rotate the disk 10 at a constant rotational speed. Spindle motor driver 12 provides digital status signals on output lines 34 and 39, such as a SPINDLE SPEED STABLE signal, and an analog spindle motor current signal on line 38 which is a measure of the spindle current being applied to the spindle motor.

The above description refers to the components of the conventional magnetic recording disk drive. Also shown in FIG. 1 are those components necessary for the present invention. An electrically powered vacuum pump 50 attached to pump motor 52 is mounted on the exterior of the disk drive housing to the wall of base 30. The inlet to the pump 50 is connected through an opening in the wall of base 30, and a check valve 54 is located between the internal environment of the housing and the pump 50. The pump motor 52 is electrically connected to pump control circuit 56 which receives power from the disk drive power supply 60. As shown in FIG. 1, the power supply 60 also supplies power to the other components of the disk drive, such as the spindle motor driver 12.

The pump control circuit 56 is used to turn the pump motor 52 on and off to reduce the pressure within the substantially sealed environment of the disk drive housing in order to control the internal pressure to a reduced level. In the preferred embodiment the pump control circuit 56 is controlled by a signal on line 38 from the spindle motor driver 12 that represents the spindle motor current. In an alternative embodiment, the pump control circuit 56 receives input on line 59 from an internal pressure sensor 58 located within the housing.

Figure 2:
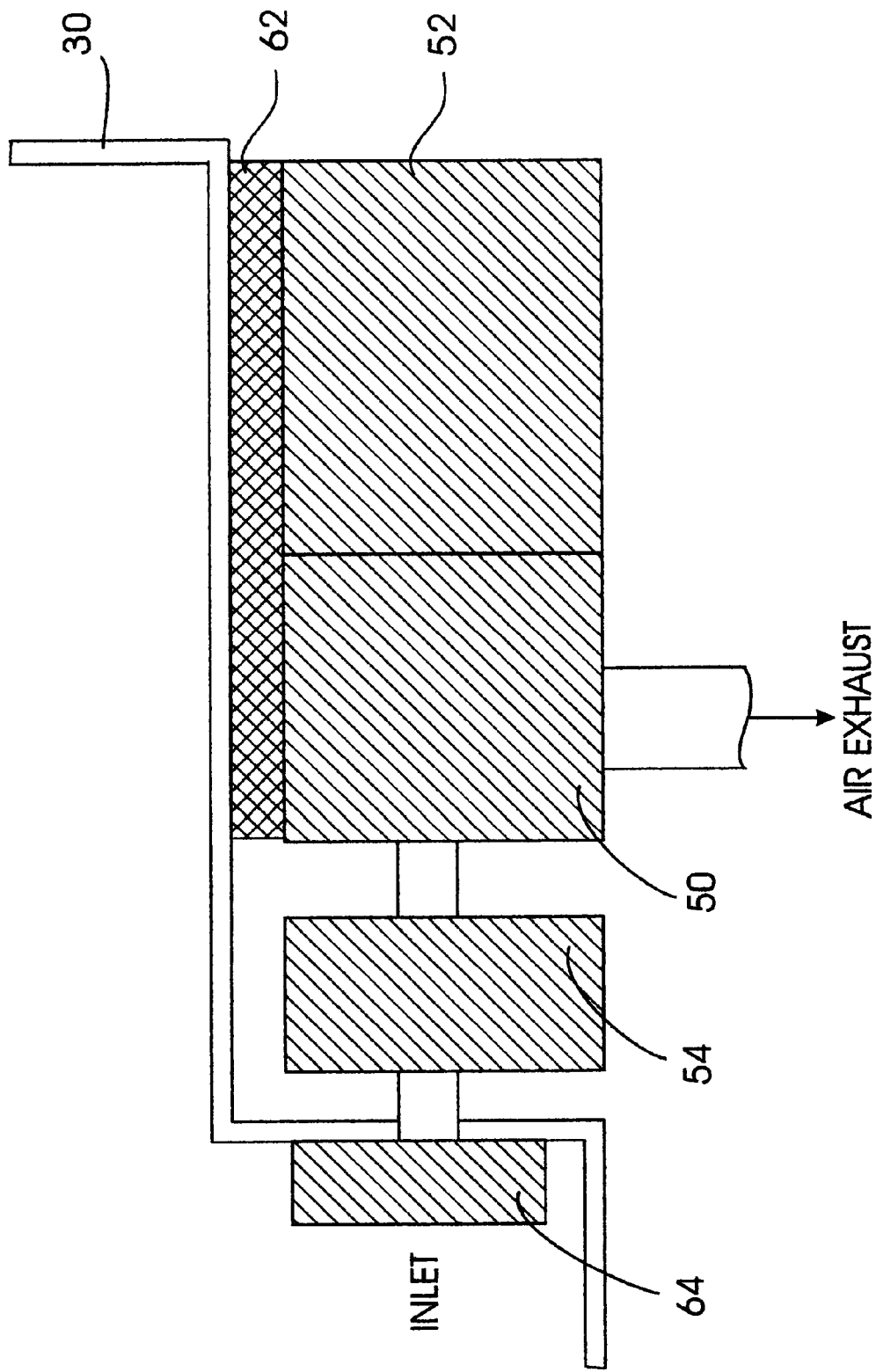
FIG. 2 is a view of the attachment of the vacuum pump and pump motor to the housing of the disk drive.

FIG. 2 is a more detailed view showing the mounting of the pump 50 and pump motor 52 to the exterior of the disk drive housing. The pump 50 is preferably a diaphragm pump, such as DC-motor driven Thomas Industries 2002 Series pump, but can also be a piston/cylinder or solenoid type pump. As shown, a layer of damping material 62 acts as a vibration isolator between the disk drive housing and the pump 50 and motor 52. The damping material may be an elastomeric material, such as silicone or rubber. The pump 50 and pump motor 52 may be mounted to the wall of housing base 30 by machine screws through the damping material 62 or by a suitable adhesive that adheres to the pump 50, motor 52, damping material 62 and base 30. A check valve 54 opens when the pump is turned on so that the air in the housing may exit and is automatically closed when the pump is turned off to provide a seal to maintain the reduced pressure within the housing. An air filter 64 is located in the interior of the disk drive and filters any contaminants from air that may leak back into the housing past the check valve when the pump is off. It is also within the scope of the present invention to mount the pump and motor inside a walled-in recess of the disk drive housing, with an interior wall sealing the pump and motor from the disk drive components. However, as shown in FIG. 1, it is important that the overall generally rectangular shape or form factor of the disk drive not be changed so that the disk drive can fit into existing computer bays.

Figure 3:
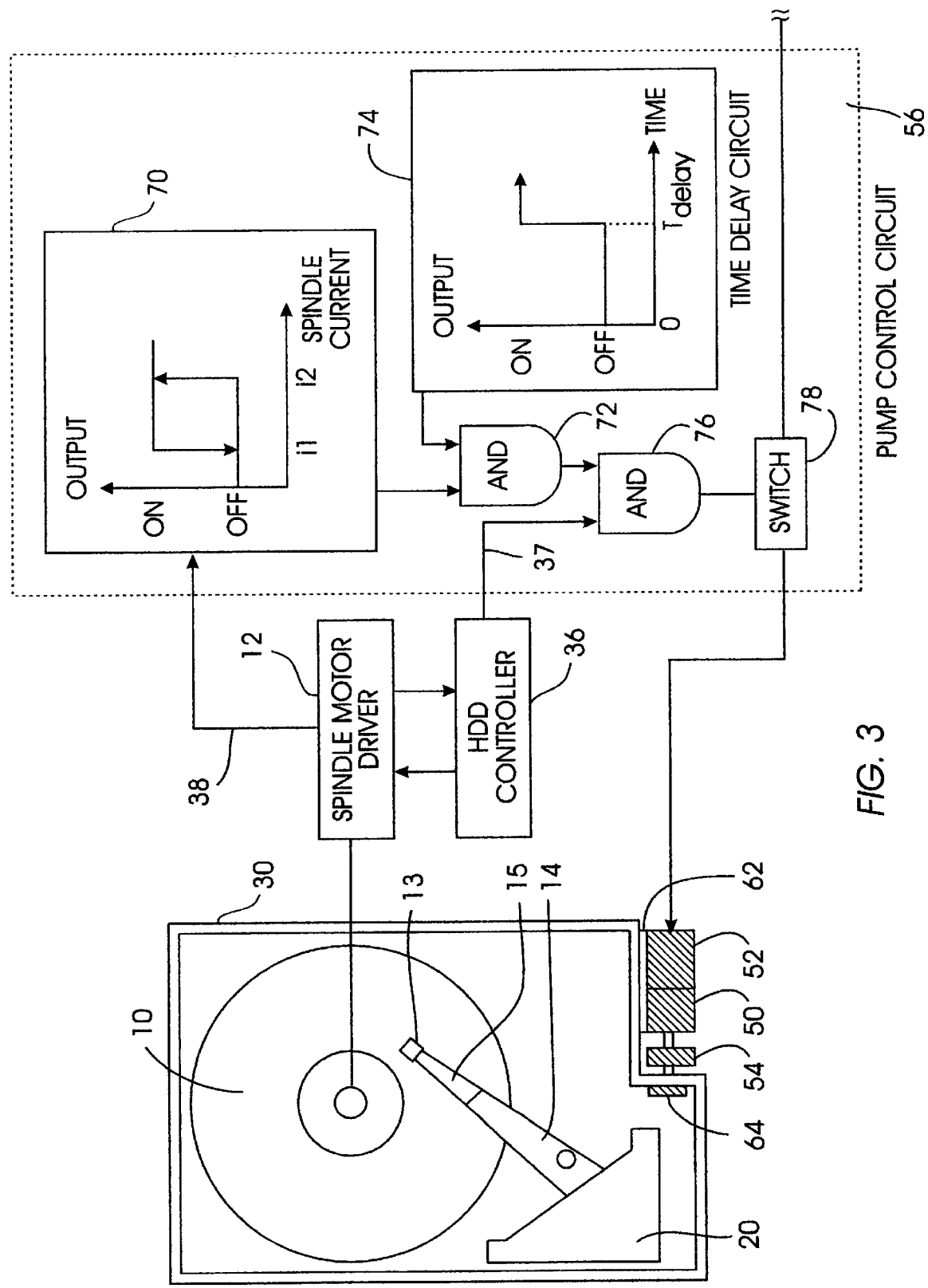
FIG. 3 is a block diagram of the preferred embodiment of the magnetic recording disk drive incorporating the present invention showing spindle motor current as the input to the pump control circuitry.

FIG. 3 is a more detailed schematic of the preferred embodiment of the present invention using the spindle motor current signal to control the pump control circuit 56. The pump control circuitry includes hysteresis circuit 70 and time delay circuit 74. The spindle motor current signal is input on line 38 to hysteresis circuit 70. The output of hysteresis circuit 70 serves as one of the inputs to AND gate 72. The other input to AND gate 72 is provided by a time delay circuit 74. The output of AND gate 72 is one of the inputs to a AND gate 76. An IDLE signal on line 37 from the controller 36 is the second input to AND gate 76. The output of AND gate 76 controls switch 78 located between pump motor 52 and the power supply.

Figure 4:
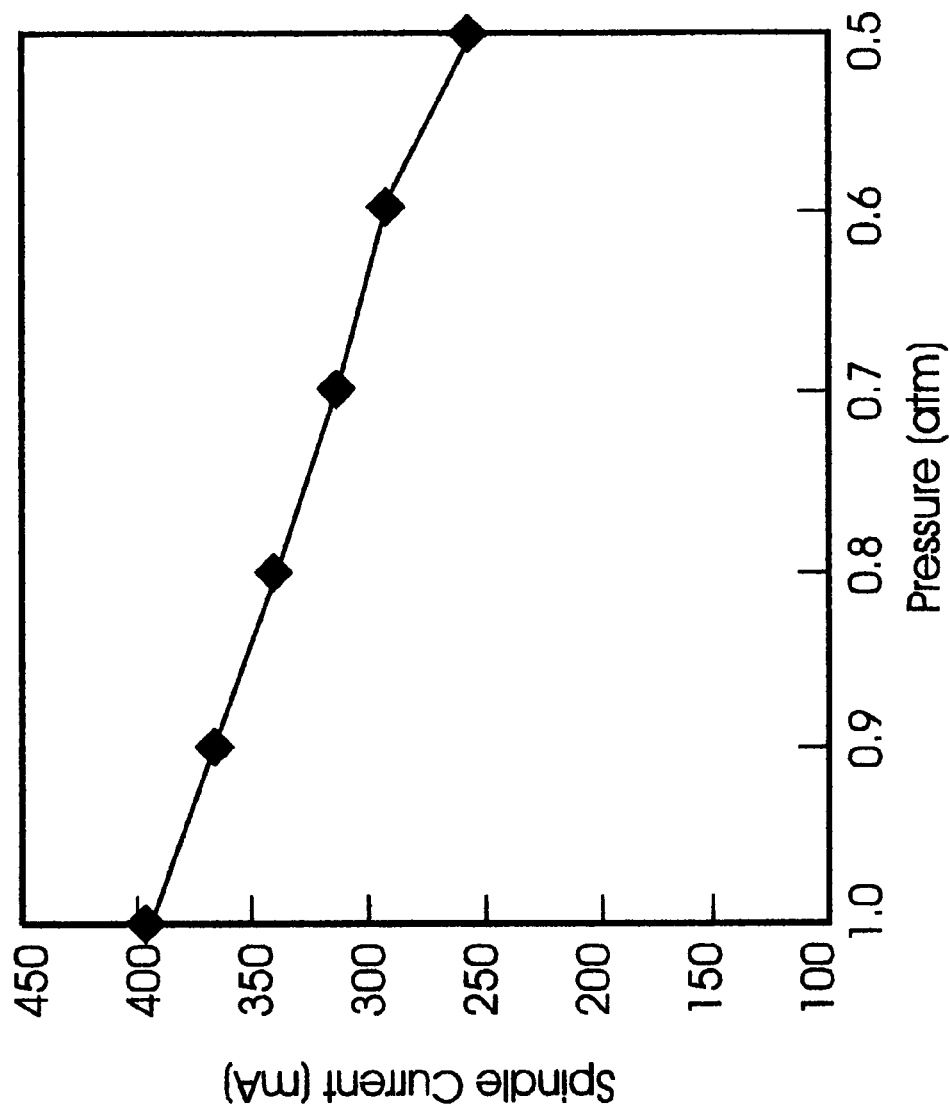
FIG. 4 is a graph of spindle motor current as a function of internal disk drive housing pressure for a 3.5 inch form factor disk drive operating at 7200 RPM.

The use of spindle motor current as the measured input to control the pump 50 is based upon the observation that the spindle motor draws more current as the internal pressure is increased. This is shown by the graph in FIG. 4. For a 3.5 inch form factor disk drive with an internal pressure of 1 atmosphere and the spindle motor operating at 7200 RPM, the spindle motor draws approximately 400 milliamps. When the pressure is reduced to approximately 0.5 atmospheres, the spindle motor current is reduced to approximately 250 milliamps.

Referring again to FIG. 3, the operation of the preferred embodiment will be explained. In this embodiment it is desired to maintain the pressure within the disk drive between approximately 0.5 and 0.6 atmospheres. When the disk drive is first turned on, the output from the time delay circuit 74 is OFF. This is because when the spindle motor is spinning up after it is first turned on, it draws more current than when it is rotating at its normal operating speed. Thus, during spin up the spindle current value is higher than the value corresponding to 1 atmosphere pressure. However, even though the output of hysteresis circuit 70 is ON, because the output from time delay circuit 74 is OFF the output of AND gate 72 is low and the pump motor 54 remains off. The time delay circuit 74 is typically selected to maintain a time delay for a period of approximately 10 to 20 seconds. After this time delay the output of time delay circuit 74 turns to ON and the hysteresis circuit 70 output alone controls the output of AND gate 72. The time delay circuit 74 thus acts to prevent the pump from turning on until the spindle motor reaches its stable operating speed. Based upon experimental data, as shown for example by FIG. 4, the hysteresis circuit 70 set points are determined so that the internal pressure is controlled to within the desired reduced pressure range. After the time delay has expired, the pressure within the disk drive will be close to atmospheric and thus the output of hysteresis circuit 70 will be ON and the output of AND gate 72 will be high. If the disk drive is not reading or writing, the controller 36 will provide a high signal on IDLE line 37 to the other input to AND gate 76 and the switch 78 will turn on power to the pump motor 52. As the pump 50 continues to reduce the pressure within the housing the spindle motor current will decrease to a value corresponding to the lower pressure level. This will cause hysteresis circuit 70 to generate an OFF signal to AND gate 72. This will turn off the switch 78 to remove power to pump motor 54. Circuits that perform the straightforward function of hysteresis circuit 70 are well known and can be designed with conventional components, such as a comparator with hysteresis, which essentially functions as a Schmitt trigger with presettable trigger points. One such design is described in National Semiconductor product specification sheets for comparator LM139, which is incorporated herein by reference. As an alternative to the time delay circuit 74 the SPINDLE SPEED STABLE signal on line 34 (FIG. 1) from spindle motor driver 12 can be used as the input to AND gate 72 to serve as the means for preventing the pump from turning on until the spindle motor has reached its stable operating speed.

Figure 5:
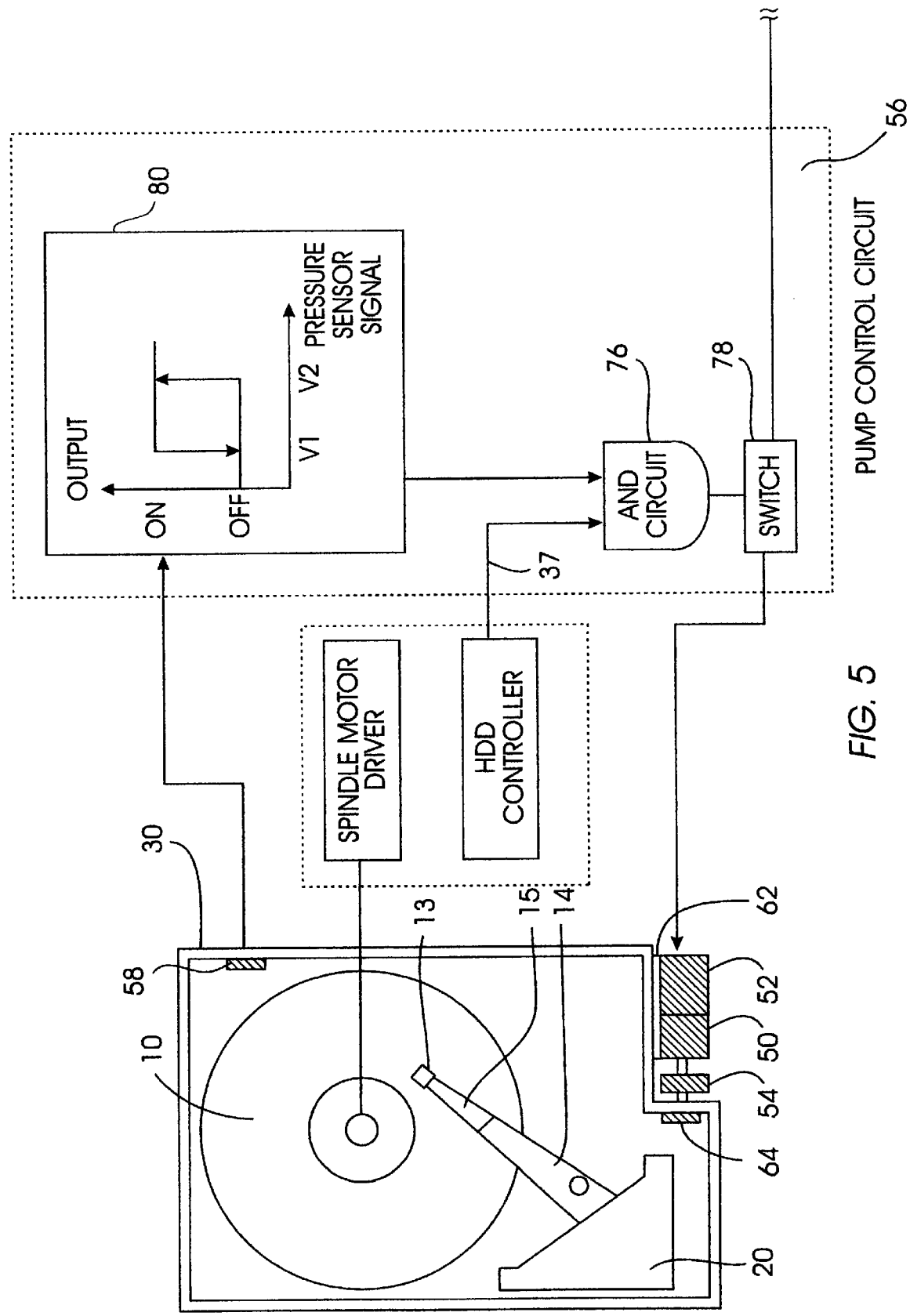
FIG. 5 is a block diagram of an alternative embodiment of the magnetic recording disk drive incorporating the present invention showing a pressure sensor output signal as the input to the pump control circuitry.

FIG. 5 is a schematic of an alternative embodiment of the present invention that uses a pressure sensor 58 as the input to hysteresis circuit 80. The pressure sensor 58 may be a commercially available sensor that outputs a voltage V depending upon the sensed pressure, such as Lucas/Nova sensor model NPP-301. Because pressure sensor 58 provides a direct measure of internal pressure there is no need to wait until the spindle motor has reached its stable operating speed. Thus, the operation of pump control circuit 56 is substantially as explained previously, but without the need for the time delay. The voltage levels V1 and V2 in hystersis circuit 80 correspond to the low and high pressure levels, respectively, of the desired reduced pressure range. The hysteresis circuit 80 turns ON when the pressure sensor input increases from a lower value to the high value V2, and turns OFF when the input decreases from a high value to the low value V1.

In both embodiments of the present invention as shown in FIGS. 3 and 5, the controller 36 provides an IDLE signal on line 37 to AND gate 76 indicating that the disk drive is not performing a read or write operation. The IDLE signal must be high for the pump motor 52 to turn on because it is not desirable to have the pump operating during read or write operations. In head load/unload type disk drives, the HEAD UNLOADED signal would be the preferred signal on line 37 from controller 36 to AND gate 76. Because the radial position of the heads on the disks does slightly affect the spindle motor current (i.e., a slightly higher current is required when the heads are at the disk inside diameter), the spindle motor current will more accurately reflect the internal pressure when the heads are unloaded from the disks.

While the operation of the present invention has been described with respect to the circuitry shown in FIGS. 3 and 5, the invention can also be fully implemented in a software embodiment. In conventional magnetic recording disk drives all of the disk drive functions are controlled by the HDD controller, and the spindle motor driver provides digital output signals to the HDD controller for both spindle motor current (MTRCNT) and spindle motor status (SPINDLE SPEED STABLE). The SPINDLE SPEED STABLE signal indicates whether the spindle motor is spinning up or has achieved its steady state operating speed. By connecting one of the output pins of the HDD controller to a field effect transistor (FET) that is connected between the pump motor and the power supply, the present invention can be realized. In this embodiment equivalent to that described above, the HDD controller will switch the FET to ON whenever the IDLE signal (or the HEAD UNLOADED signal if the disk drive is the head load/unload type) is high, the spindle motor SPINDLE SPEED STABLE signal indicates steady state and the MTRCNT signal is above a predetermined value. In this software equivalent embodiment the HDD controller functions as the pump control circuitry. A slight modification of this embodiment will also operate with the pressure sensor embodiment of FIG. 5, with the minor addition of an analog-to-digital converter located between the pressure sensor and an input to the HDD controller. In this embodiment the SPINDLE SPEED STABLE and MTRCNT signals are not needed.

While the invention has been described using spindle motor current or measured pressure from a pressure sensor as the input that enables the pump to be responsive to the gas pressure within the housing, and to thus maintain the internal pressure within a reduced pressure range, other inputs to the pump are also within the scope of the present invention. For example, a mechanical differential pressure switch can be coupled to the pump to turn the pump on and off when the differential pressure causes movement of a diaphragm or piston located between the drive interior and exterior.

The head carrier used in the present invention is a conventional air-bearing slider of the type well known in the art which has an air-bearing surface (ABS) designed to maintain the head-disk spacing at the desired level for the reduced pressure environment. There are commercially-available sliders that have an ABS designed to fly properly over the disk surface at 0.7 atmospheres. Thus in the present invention the slider has an ABS designed with standard ABS design tools, by setting the pressure to the desired value, e.g. 0.5 to 0.6 atmospheres.

Figure 6:
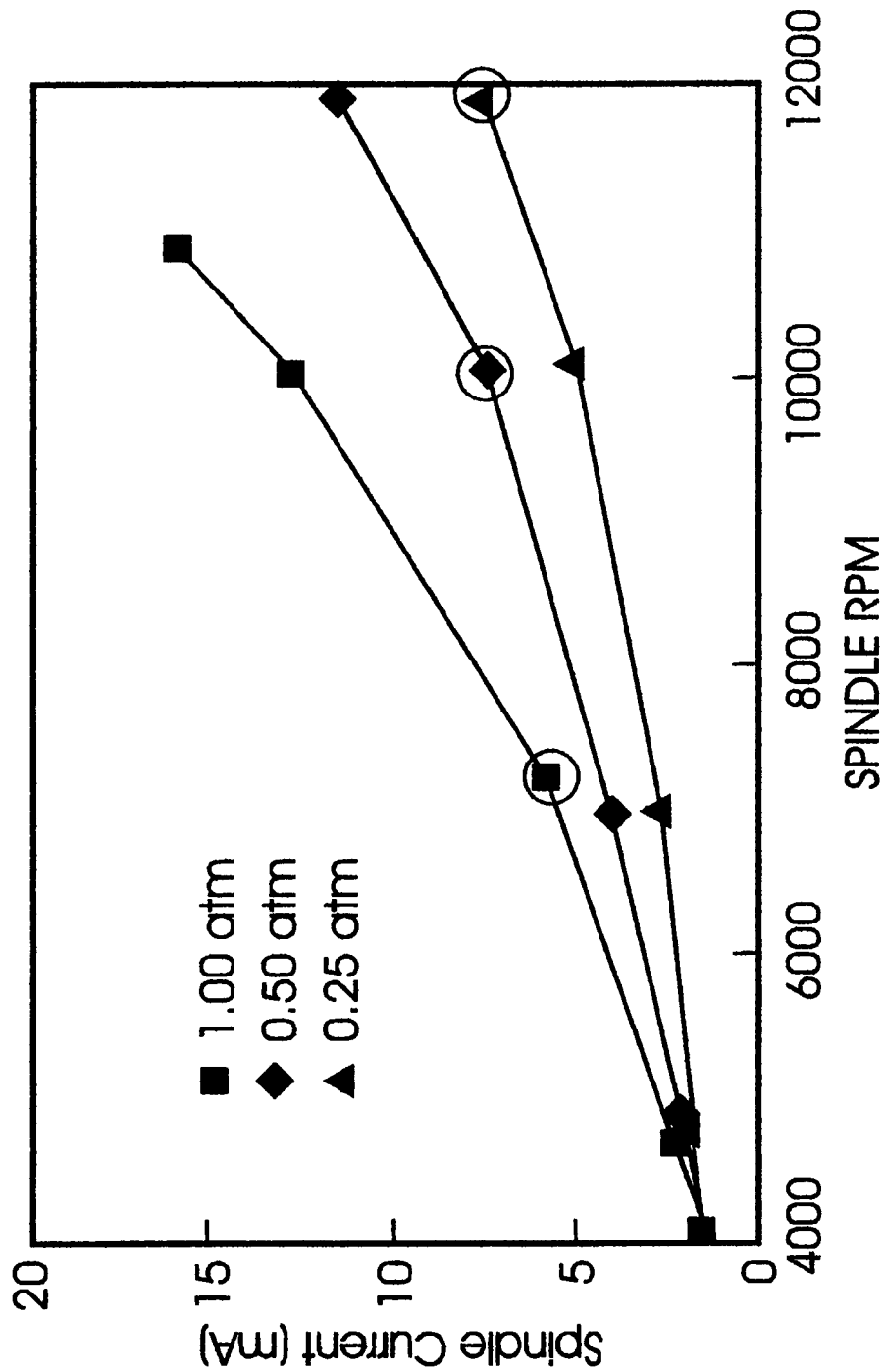
FIG. 6 is a graph of spindle motor power as a function of disk RPM for three different reduced internal pressure levels in the disk drive housing.

Referring now to FIG. 6, the benefit of the present invention can be readily seen from the graph of spindle motor power as a function of disk RPM for three different internal pressure levels. It is desirable to operate at a high disk RPM to improve disk drive performance. The data of FIG. 6 shows that when the internal pressure is reduced to approximately 0.25 atmosphere, the disk drive can operate at 12,000 RPM and still use only slightly more power (7.7 W) as when it is operating at 7200 RPM at a normal 1 atmosphere pressure (6.0 W). In addition to the reduction in power and the associated reduction in heat generated, operation in a reduced pressure environment also substantially reduces the flutter of the disks and airflow-induced vibration of the suspensions and arms, which typically occur at high speed rotation. A measure of non-repeatable disk runout for various disk drives have demonstrated a 40% reduction in track misregistration when the internal pressure is reduced from 1 atmosphere to 0.35 atmospheres.

Because most disk drives provide a very tight seal to protect the internal components, the internal pressure increases at a very slow rate. For example, using a conventional commercially available 3.5 inch form factor disk drive, the reduced internal pressure can be maintained in the desired range of 0.5 to 0.6 atmosphere by turning the pump on approximately every 10 to 14 days for a period of only 1–2 minutes.

While the above description of the invention has been made with reference to air as the typical internal gaseous environment, other gaseous environments for disk drives have been proposed, such as the use of helium, nitrogen or argon. The benefits of the present invention are also fully realized with disk drives operating in these other gaseous environments.

While the preferred embodiments of the present invention have been illustrated in detail, it should be apparent that modifications and improvements may be made to the invention without departing from the spirit and scope of the invention as described in the following claims.

What is claimed is:

1. A magnetic recording disk drive comprising:
   a rigid magnetic recording disk;
   an electrical spindle motor connected to the disk for rotating the disk;
   a head for reading data from or writing data to the disk;
   a carrier for supporting the head near the surface of the disk;
   an actuator connected to the carrier for moving the carrier and supported head across the disk;
   a disk drive housing providing a substantially sealed gaseous environment for the disk and carrier;
   a pressure sensor for sensing the gas pressure within the housing;
   a pump attached to the housing and having an inlet connected to the interior of the housing;
   an electrical motor coupled to the pump for driving the pump; and
   pump control circuitry responsive to a signal from the pressure sensor and connected to the pump motor for turning the pump motor on and off to maintain the pressure within the housing within a range of pressures less than the pressure external to the housing.

2. The disk drive according to claim 1 wherein the pump is located within the housing.

3. The disk drive according to claim 1 wherein the pump is located outside the housing.

4. The disk drive according to claim 1 further comprising vibration damping material located between the pump and the housing.

5. The disk drive according to claim 1 wherein the pump is a diaphragm pump.

6. The disk drive according to claim 1 further comprising means coupled to the pump control circuitry for preventing the pump from turning on when the head is reading or writing data.

7. The disk drive according to claim 1 wherein the disk drive is the head load/unload type of disk drive and further comprising means for permitting the pump to turn on only when the head is unloaded from the disk.

8. The disk drive according to claim 1 wherein the disk drive includes a hard disk drive controller and wherein the pressure sensor is coupled to the controller.

9. A magnetic recording disk drive having a rigid magnetic recording disk, an electrical spindle motor connected to the disk for rotating the disk, a spindle motor driver for controlling the spindle motor, a head for reading data from or writing data to the disk, a carrier for supporting the head near the surface of the disk, an actuator connected to the carrier for moving the carrier and supported head across the disk, a power supply for providing electrical power to the spindle motor, a controller coupled to the spindle motor driver and the head for controlling the spindle motor driver and the reading and writing of data by the head, and a housing providing a substantially sealed gaseous environment for the disk and carrier, and wherein the spindle motor driver provides a spindle motor speed status signal and a spindle motor current signal to the controller, the disk drive comprising:
   an electrically-powered vacuum pump electrically coupled to the power supply and attached to the housing, the pump having an inlet connected to the interior of the housing;
   a switch coupled between the pump and the power supply and controlled by the controller; and
   wherein, when the head is not reading or writing data, the controller turns on the switch when the spindle motor status signal indicates the spindle motor is operating at substantially its operating speed and the spindle motor current signal indicates the spindle motor current is above a first value representative of a high gas pressure level within the housing, and turns off the switch when the spindle motor current signal indicates the spindle motor current is below a second value representative of a low gas pressure level within the housing; whereby the gas pressure within the housing is maintained within a predetermined reduced pressure range.

10. A magnetic recording disk drive comprising:
    a rigid magnetic recording disk;
    an electrical motor connected to the disk for rotating the disk;
    a head for reading data from or writing data to the disk;
    a carrier for supporting the head near the surface of the disk;
    an actuator connected to the carrier for moving the carrier and supported head across the disk;
    a disk drive housing providing a substantially sealed gaseous environment for the disk and carrier;
    an electrically-powered pump attached to the housing for removing gas from within the housing; and electrical control circuitry responsive to the disk motor current and coupled to the pump for turning the pump on when the disk motor current exceeds a first value corresponding to a first level of gas pressure within the housing.

11. The disk drive according to claim 10 wherein the electrical control circuitry includes means for preventing the pump from turning on until the disk motor has reached its stable operating speed.

12. The disk drive according to claim 11 wherein the means for preventing the pump from turning on comprises time delay circuitry for preventing the pump from turning on for a period of time after the disk motor is turned on.

13. The disk drive according to claim 10 wherein the electrical control circuitry also turns the pump off when the disk motor current falls below a second value less than said first value.

14. A magnetic recording disk drive comprising:
a rigid magnetic recording disk;
an electrical spindle motor connected to the disk for rotating the disk;
a head for reading data from or writing data to the disk;
a carrier for supporting the head near the surface of the disk;
an actuator connected to the carrier for moving the carrier and supported head across the disk;
a disk drive housing providing a substantially sealed gaseous environment for the disk and carrier;
a pump attached to the housing and having an inlet connected to the interior cif the housing;
an electrical motor coupled to the pump for driving the pump;
pump control circuitry responsive to a signal representative of spindle motor current and connected to the pump motor for turning the pump motor on and off to maintain the pressure within the housing within a range of pressures less than the pressure external to the housing; and means connected to the pump control circuitry for providing said spindle motor current signal to the pump control circuitry.

15. The disk drive according to claim 14 wherein the pump control circuitry includes means for preventing the pump from turning on until the spindle motor has reached its stable operating speed.

16. The disk drive according to claim 15 wherein the means for preventing the pump from turning on comprises time delay circuitry for preventing the pump from turning on for a period of time after the spindle motor is turned on.

17. The disk drive according to claim 14 wherein the pump is located within the housing.

18. The disk drive according to claim 14 wherein the pump is located outside the housing.

19. The disk drive according to claim 14 further comprising vibration clamping material located between the pump and the housing.

20. The disk drive according to claim 14 wherein the pump is a diaphragm pump.

21. The disk drive according to claim 14 further comprising means coupled to the pump control circuitry for preventing the pump from turning on when the head is reading or writing data.

22. The disk drive according to claim 14 wherein the disk drive is the head load/unload type of disk drive and further comprising means for permitting the pump to turn on only when the head is unloaded from the disk.

23. The disk drive according to claim 14 wherein the disk drive includes a hard disk drive controller and a spindle motor driver coupled to the controller, wherein the pump control circuitry comprises the controller and wherein the means for providing said spindle motor current signal comprises the spindle motor driver.

* * * * *